July 15, 1952 C. A. KING 2,603,300
WIND MOTOR
Filed July 16, 1948 3 Sheets-Sheet 1

Inventor
CHARLES A. KING,
By McMorrow, Berman & Davidson
Attorneys

July 15, 1952　　　C. A. KING　　　2,603,300
WIND MOTOR
Filed July 16, 1948　　　　　　3 Sheets-Sheet 2
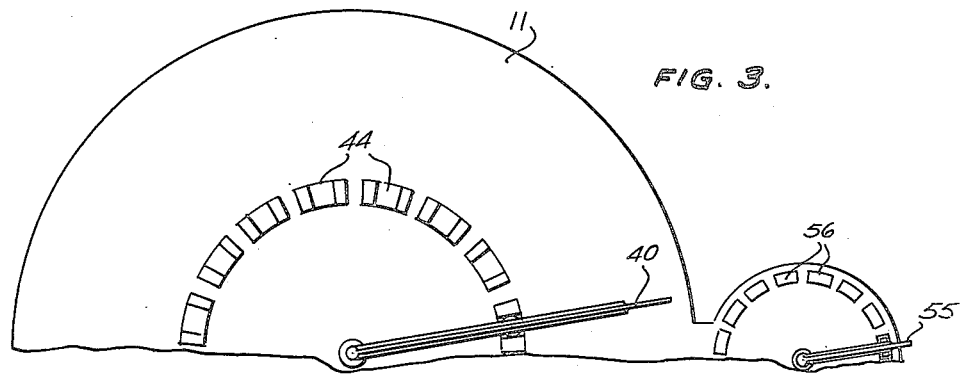
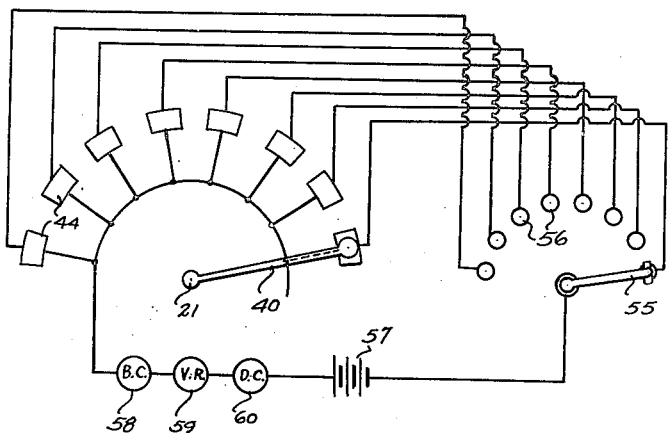
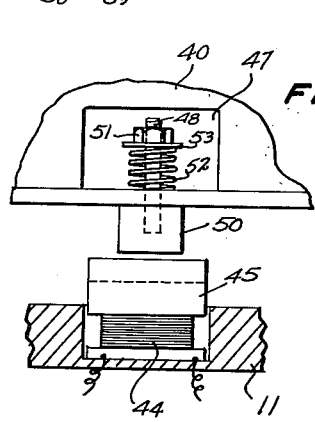 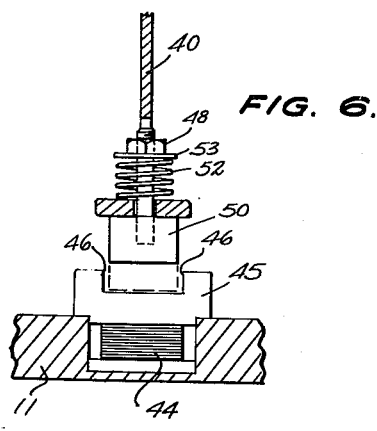
CHARLES A. KING, Inventor
By McMorrow, Berman & Davidson
Attorneys July 15, 1952            C. A. KING            2,603,300
WIND MOTOR
Filed July 16, 1948                          3 Sheets-Sheet 3
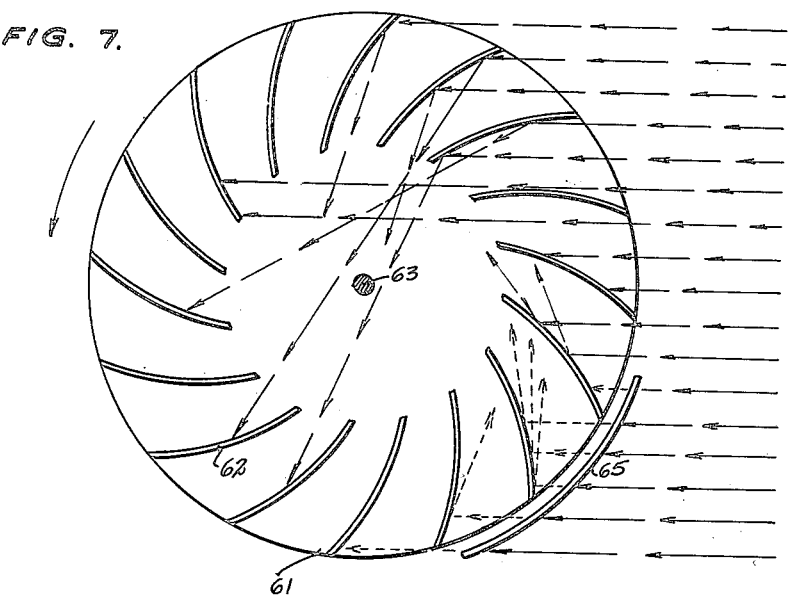
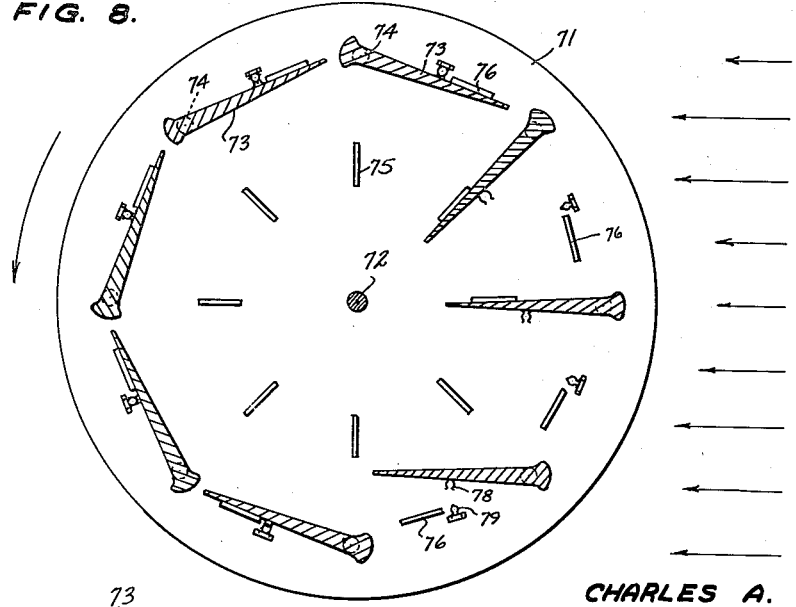
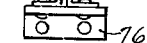
Inventor
CHARLES A. KING,
By McMorrow, Berman + Davidson
Attorneys Patented July 15, 1952

2,603,300

UNITED STATES PATENT OFFICE 2,603,300

WIND MOTOR

Charles A. King, Mission, Tex.

Application July 16, 1948, Serial No. 39,021

2 Claims. (Cl. 170—24)

This invention relates to wind motors.

It is an object of this invention to provide a wind motor operable about a central vertical axis. The vanes may be fixed, hinged, or rotatable, as the case may be.

In accordance with one form of the invention, a vane frame is constructed to rotate about a vertical axis, the vane frame itself comprising a series of rotatable vanes, these vanes rotating once on their individual vertical axes for each two revolutions of the frame. The motion of the frame is transmitted to a drive belt to be utilized as desired. A directional vane is positioned above the vane frame and is movable by the wind to move the rotating vanes into proper position with respect to the wind for most efficient operation. This directional vane is electro-magnetically controlled by a series of electromagnets to be locked in position with respect to a stationary support, as long as the wind is steady. When the wind changes, the directional vane is automatically moved in accordance with the direction of the wind to again position the vane frame and its rotating vanes.

In another form of the invention, an open cylindrical frame is provided with a series of vanes fixed thereto, the angle and the direction of these vanes being such as to result in the production of power irrespective of the direction of the wind.

In still another form of the invention, a cylindrical frame is provided with a series of movable vanes hinged about symmetrically arranged vertical axes, these vanes swinging to and fro as the frame is rotated.

The invention will be described more particularly with reference to the accompanying drawings. It is understood, however, that these drawings are illustrative and not definitive, and that changes may be made in the invention without departing from the spirit thereof as hereinafter claimed.

Figure 3 is an enlarged plan of the electromagnetic control.

Figure 4 is a wiring diagram of the electromagnetic control.

Figure 5 is an enlarged elevation of one of the electromagnets, shown when the directional vane is disengaged therefrom.

Figure 6 is a view at right angles to Figure 5, showing the directional vane engaged with the electromagnet.

Figure 7 is a schematic plan view of a second form of the invention.

Figure 8 is a schematic plan view of a third form of the invention.

Figure 9 is an enlarged detail showing a frictional clutch for temporarily locking the hinged vane of Figure 8.

Figure 1:
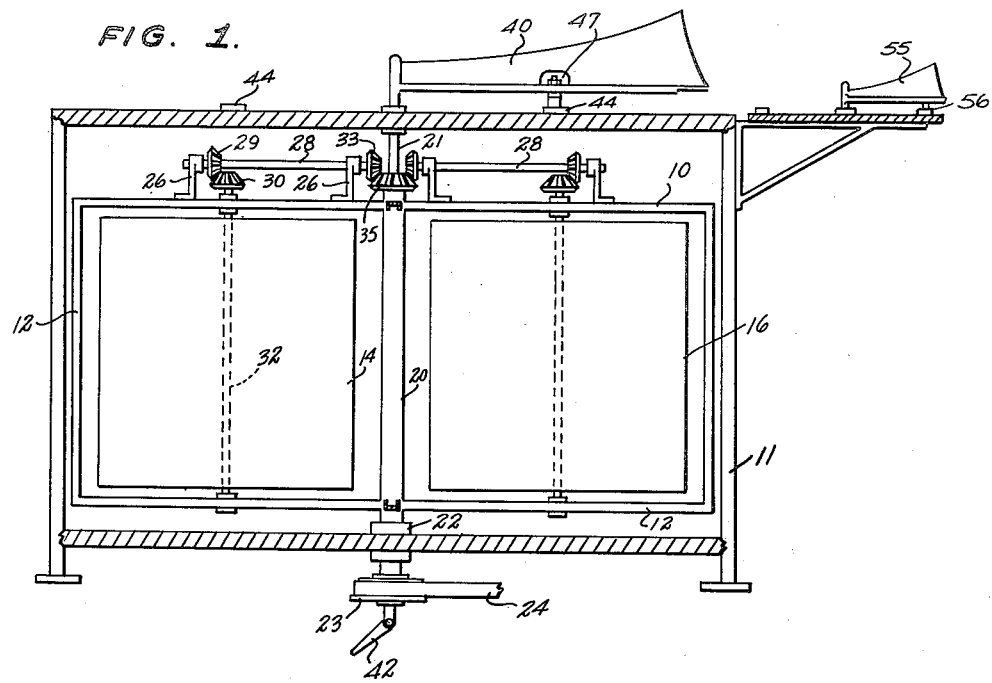
Figure 1 represents a front elevation, partly in section, of the first form of the invention, which includes an electromagnetic control.

The species of invention illustrated in Figures 1, 2, 3, 4, 5, and 6 will be described first.

A rotatable frame 10 is mounted for rotation about a vertical axis within a stationary support 11. The frame 10 comprises four quadrangular brackets 12, these brackets 12 being arranged in a cruciform shape as viewed from the top, and being fixed with respect to one another. It is obvious, of course, that the number of brackets 12 is arbitrary, and that more or fewer may be used. The brackets 12 are adapted to support the rotating vanes 14, 15, 16, and 17, so arranged that they rotate about vertical axes in the central portion of the brackets 12.

A central vertical portion of the frame 10 constitutes a sleeve 20 that is rotatable about a shaft 21 contained therein. The lower portion of the sleeve 20 is supported by a thrust bearing 22 mounted on an extension of the stationary support 11. The lower extremity of the sleeve 20 projects below the thrust bearing 22 and carries thereon a pulley 23. A drive belt 24 is trained over the pulley 23 to transmit the power of the frame 10 as it rotates about the axis of the shaft 21.

Figure 2:
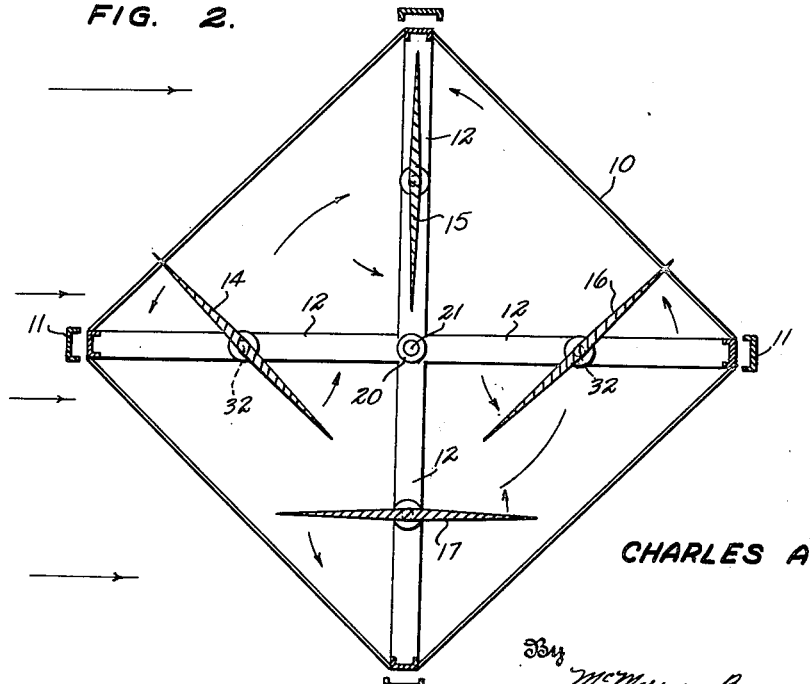
Figure 2 is a horizontal section through the structure of Figure 1, some of the parts being omitted for the sake of clarity.

On top of each bracket 12 a pair of bearings 26 support a horizontal shaft 28. Each shaft 28 has a bevel gear 29 that meshes with a similar gear 30 at the upper extremity of the vertical shaft 32 on which each of the rotating vanes 14, 15, 16, and 17 is fixed. As a result, as the rotating vanes rotate about the vertical shafts 32, the motion thereof will be transmitted to the horizontal shafts 28. Each of the shafts 28 carries another bevel gear 33, and all four bevel gears 33 engage a bevel gear 35 fixed to the shaft 21. The gearing is such that the vanes 14, 15, 16, and 17 turn once on their shafts 32 for each two revolutions of the frame 10 about the axis of the sleeve 20. The vanes 14, 15, 16, and 17 are, of course properly synchronized so that their effects will be cumulative and not opposite. One arrangement is shown in Figure 2 of the drawings. With the wind coming from the left, the individual vanes 14, 15, 16, and 17 will be rotated about their shafts 32 in a counter-clockwise direction, as indicated by the small arrows near the vanes. At the same time, the frame 10 will be rotated in an opposite direction, as indicated by the clockwise arrows within the frame 10.

Fixed to the upper extremity of the vertical shaft 21, above the stationary support 11, is a directional vane 40. It is obvious that when this vane 40 is turned, it will also turn the bevel gear 35 to which both the vane 40 and the shaft 21 are fixed, and this turning will vary the angular positioning of the vanes 14, 15, 16, and 17 with respect to the wind during the rotational cycle of the frame 10. For operation of the rotating frame 10, the bevel gears 33 must be free to rotate on the bevel gear 35. If the bevel gears 33 are locked to the gear 35, the movable frame 10 will be locked to the directional vane 40, and the device will be either inoperative or movable at such a low rate of speed that no power will be produced. Such locking may be accomplished by means of a dog 42 pivoted to the lower extremity of the shaft 21, below the pulley 23, and this dog 42 is insertable in an appropriate slot in the lower face of the pulley 23 to lock the dog 42 to the pulley 23 and to the sleeve 20.

The upper surface of the support 11 is provided with a series of electromagnets 44, arranged in a circle about the center of the shaft 21. Positioned above each electromagnet 44 is a cup 45 having a pair of flanges 46 arranged radially of the shaft 21, or perpendicularly to the path of travel of the directional vane 40. The directional vane 40 has an aperture 47, and mounted for vertical movement in the aperture 47 is a piston rod 48. A piston 50 is attached to the piston rod 48 under the lower edge of the directional vane 40. A nut 51 is threaded on the upper end of the piston rod 48, and a spring 52 is positioned between the lower edge of the directional vane 40 and a washer 53 under the nut 51. Each of the electromagnets 44 is of sufficient strength and energized to attract the piston 50 into the cup 45 against the pressure of the spring 52. When so attracted, the piston 50 will be caught against the flanges 46 of the cup 45 to lock the directional vane 40. When the electrical circuit of the electromagnets 44 is broken, the spring 52 will at once retract the piston 50 and release the directional vane 40.

The wiring circuit for the electromagnets 44 includes a governing vane, which is also mounted for movement about a vertical axis on the upper surface of the support 11. This governing vane 55 is adapted to contact a series of contacts 56 on the upper surface of the support 11. There are as many contacts 56 as there are electromagnets 44, and each one of the contacts 56 is electrically connected to an appropriate electromagnet 44. The circuit between any one of the contacts 56 and its complementary electromagnet 44 will be completed when the governing vane 55 is in proper position. An example is shown in Figure 4 of the drawings. When the vanes 40 and 55 are as shown, the circuit is completed and the directional vane 40 is locked in position, as hereinbefore described. When the wind shifts, the governing vane 55 will be moved first, and the electrical circuit will at once be broken. Whatever electromagnet 44 is holding the piston 50 will be de-energized, and the directional vane 40 will then be free to turn to the same relative position as the governing vane 55, at which time the piston 50 will pass over the newly-activated magnet 44 and become locked in its new position.

If desired, the electrical circuit will include, in addition to a battery 57, a battery charger 58, a voltage regulator 59, and an overload cut-out 60.

A second form of wind motor is shown in Figure 7 of the drawings.

In this form of the invention, an apertured frame 61, having a series of vanes 62 fixed thereto on the inside, is adapted to rotate about a vertical axis 63. The vanes 62 are shown as curved, but they may have any shape desired. The action of this motor does not depend upon the curvature or shape of the vanes 62, but principally on the angle of the vanes 62 with respect to the frame 61. This angle should be substantially 45°. The vanes 62 should extend about half-way between the frame 61 and the vertical shaft 63. With the wind coming from the right, as indicated in Figure 7 of the drawings, the air will be entrapped within the frame 61 to build up a high pressure therein. As the air leaves the frame 61 to emerge on the leeward or left side, it reacts with the vanes 62, as indicated by the arrows within the frame 61, to rotate the frame 61 in a counter-clockwise direction. It is necessary to have a solid disc top and a solid disc bottom on the frame 61 in order to build up the high pressure within the frame 61. An arcuate shield 65 that is positioned by a directional vane is arranged to cover a sector of the frame 61 for the purpose of channelizing the incoming air to increase the efficiency of the device.

Figure 8 shows in schematic form a third species of the invention.

A frame 71 is mounted for rotation on a vertical shaft 72. A series of vanes 73 is carried within the frame 71, each one of the vanes 73 being hinged about a vertical pin 74. The pins 74 are arranged symmetrically and equidistant from the vertical shaft 72. The frame 71 also carries a pair of stops for each of the vanes 73. Each pair of stops comprises an inner stop 75 and an outer stop 76, these stops limiting the movement of the vane 73 about its pin 74. The location of the stops 75 and 76 is such that each of the vanes 73 is held at the proper position to divert part of the wind to the interior of the mill. With the wind coming from the right, as indicated in the figure, the vanes 73 will assume the positions shown, so that the resultant of all the forces will tend to turn the frame 71 in a counter-clockwise direction.

To avoid bouncing and chattering of the vanes 73 against their stops 75 and 76, each of the vanes 73 is provided on both sides with a friction catch 78. The stops 75 and 76 are provided with complementary catches 79 to frictionally engage the catches 78. As a result, when a vane 73 is pushed against one of the stops 75 or 76, the friction catches 78 and 79 will engage to lock the vanes 73 in position, until such time as the frame 71 has rotated to permit the wind to force the vanes 73 against the opposite stop.

In this species of the invention, the frame 71 is again provided with a solid upper disc and a solid lower disc to channelize the air within the frame 71 to build up high pressure therein. This high pressure, as it leaves the frame 71 on the low pressure side, reacts with the vanes 73 to rotate the frame 71.

I claim:

1. In a wind motor, a stationary frame, a shaft journaled vertically in said frame, a rotatable frame rotatably mounted on said shaft, a plurality of vertical vanes rotatably mounted on the rotatable frame for rotation about axes parallel to the axis of the rotatable frame, a control directional vane fixed to the shaft for rotating the shaft in response to a change in the direction of the wind, means connecting said shaft to the vanes for transmitting rotary movement of the shaft to the vanes whereby the inclination of the vanes is simultaneously varied, and electromagnetic means for releasably locking the directional vane to the stationary frame.

2. In a wind motor, a stationary frame, a shaft vertically journaled in the frame, a rotatable frame including a supporting sleeve rotatably circumposed on the shaft, a plurality of vertical vanes rotatably mounted on the frame, means for simultaneously varying the pitch of the vanes including a directional vane fixed to the shaft for rotating the shaft, a gearing connecting the shaft to the vanes for transmitting the rotation of the shaft to the vanes, a governor vane mounted on the frame for rotation about a vertical axis, a series of electromagnets arranged on the frame about the shaft, a contact carried by the directional vane and adapted to be selectively engaged by the electromagnets to lock the directional vane in various adjusted positions, a source of electrical energy, a series of contacts selectively engaged by the governor vane, said contacts being arranged in parallel circuits with the electromagnets and the source of electrical energy, whereby movement of the governor vane energizes one of the electromagnets to lock the directional vane.

CHARLES A. KING.

REFERENCES CITED

The following references are of record in the file of this patent:

UNITED STATES PATENTS

| Number | Name | Date |
| --- | --- | --- |
| 1,651,067 | Nitardy | Nov. 29, 1927 |
| 1,812,741 | Espinosa | June 30, 1931 |
| 1,964,347 | Ford | June 26, 1934 |
| 2,038,467 | Zanoski | Apr. 21, 1936 |
| 2,428,515 | Courson | Oct. 7, 1947 |
| 2,436,747 | Du Brie | Feb. 24, 1948 |